United States Patent [19]

Favot et al.

[11] Patent Number: 5,668,573
[45] Date of Patent: Sep. 16, 1997

[54] MANAGEMENT METHOD FOR A MAN-MACHINE INTERACTION SYSTEM

[75] Inventors: Jean-Jacques Favot, Martignas en Jalles; Jean-Noël Perbet, Eysines; Bruno Barbier, Bouscat; Patrick Lach, Bordeaux, all of France

[73] Assignee: Sextant Avionique, Meudon La Foret, France

[21] Appl. No.: 466,833

[22] Filed: Jun. 6, 1995

Related U.S. Application Data

[63] Continuation of Ser. No. 125,856, Sep. 24, 1993, abandoned.

[30] Foreign Application Priority Data

Sep. 25, 1992 [FR] France ................................. 92 11450

[51] Int. Cl.$^6$ ........................................................ G09G 5/00
[52] U.S. Cl. ........................................... 345/156; 395/893
[58] Field of Search .................................. 345/156, 157, 345/158, 163, 173, 1; 395/155, 159, 161, 700, 326, 506, 821, 893; 364/187; 341/20

[56] References Cited

U.S. PATENT DOCUMENTS

| | | | |
|---|---|---|---|
| 4,109,145 | 8/1978 | Graf | 345/157 |
| 4,356,475 | 10/1982 | Neumann et al. | 345/1 |
| 4,385,807 | 5/1983 | Perbet et al. | |
| 4,390,244 | 6/1983 | Hareng et al. | |
| 4,427,997 | 1/1984 | Hareng et al. | |
| 4,430,650 | 2/1984 | Billard et al. | |
| 4,525,708 | 6/1985 | Hareng et al. | |
| 4,525,709 | 6/1985 | Hareng et al. | |
| 4,535,327 | 8/1985 | Hareng et al. | |
| 4,569,575 | 2/1986 | Le Pesant et al. | |
| 4,653,858 | 3/1987 | Szydlo et al. | |
| 4,668,051 | 5/1987 | Mourey et al. | |
| 4,701,021 | 10/1987 | Le Pesant et al. | |
| 4,732,873 | 3/1988 | Perbet et al. | |
| 4,810,637 | 3/1989 | Szydlo et al. | |
| 4,818,052 | 4/1989 | Le Pesant et al. | |
| 4,824,216 | 4/1989 | Perbet et al. | |
| 4,988,981 | 1/1991 | Zimmerman et al. | 345/158 |
| 5,053,764 | 10/1991 | Barbier et al. | |
| 5,057,744 | 10/1991 | Barbier et al. | |
| 5,119,479 | 6/1992 | Arai et al. | 345/156 |
| 5,125,077 | 6/1992 | Hall | 345/163 |
| 5,148,154 | 9/1992 | Mackay et al. | 345/156 |
| 5,150,105 | 9/1992 | Perbet et al. | |
| 5,157,384 | 10/1992 | Greanias | 345/156 |
| 5,157,548 | 10/1992 | Monnier et al. | |
| 5,172,222 | 12/1992 | Plantier et al. | |
| 5,243,450 | 9/1993 | Gerbe et al. | |
| 5,285,381 | 2/1994 | Iskarous et al. | 364/187 |
| 5,404,524 | 4/1995 | Celi, Jr. | 395/700 |

FOREIGN PATENT DOCUMENTS 0 405 732   1/1991   European Pat. Off. .

OTHER PUBLICATIONS

Systems and Computers in Japan; vol. 23, No. 3, 1992, New York, pp. 38–48; T. Takahashi et al., "A Hand Gesture Recognition Method and Its Application".

Proceedings of the Twelfth Annual International Conference of the IEEE Engineering in Medicine and Biology Society, vol. 12, No. 5, 1990, pp. 2296–2297, G.E. Hamann et al., "Nod at Your Computer: Switchless Selection Techniques Using a Headpoint Device".

IEICE Transactions, vol. J70–D, No. 11, Nov. 1987, Japan, pp. 2017–2025, R.A. Bolt, "The Integrated Multi–Modal Interface".

*Primary Examiner*—Steven Saras
*Attorney, Agent, or Firm*—Oblon, Spivak, McClelland, Maier & Neustadt, P.C.

[57] ABSTRACT

The invention concerns a system for the management of an interaction system between a man (41) and a machine (12). Data input into the system are output by interaction devices (1, 2, 3, 4) from the man to the machine. At least two functions (7, 8, 9, 10) operate simultaneously on data (24, 25, 26), data input into the system being processed by a first function (7), the result of one function forming input data for the next function. The result of the last function (10) is output to interaction devices (11) from the system to the man. Functions are synchronized with each other by an exchange protocol.

5 Claims, 4 Drawing Sheets

MANAGEMENT METHOD FOR A MAN-MACHINE INTERACTION SYSTEM

This application is a Continuation of application Ser. No. 08/125,856, filed on Sep. 24, 1993, now abandoned.

BACKGROUND OF THE INVENTION

This invention concerns a method for the management of a man-machine interaction system. It is particularly applicable to man-machine interaction systems with several methods of communication from the man towards the machine such as speech recognition, recognition of gestures such as direction of looking and at least one method of communication from the machine to the man such as a display screen or speech or sound synthesis. More generally, it is applicable to any interaction system that needs to process a large amount of data.

The efficiency and ergonomy of man-machine interaction systems can be increased particularly by using several interaction devices, and these systems are then called multimedia interaction systems. In particular they present consistent data on one or several common supports. These supports are well known to men skilled in the art. Operator gestures or speech are recognized by these devices that form man-machine interfaces. They send recognized information, for example selections, validation or commands, to a system that is usually centralized. The wide variety of methods of communication particularly from man to the machine, means that different dialogue modes are possible to carry out a given action. The result is a large number of events and dialogue forms to be managed. In this type of dialogue system between an operator and a machine, consisting of a processing system and interaction devices, a large quantity of data of various types may be stored, then processed and output, possibly initiating actions. In particular these data may originate from words, gestures or positions, and similarly they may be output in the form of synthesized words, sound signals or objects or characters displayed on a screen. They can interpret the operator's wishes and satisfy his requests by taking actions on the system with which he is interacting.

Generally all types of information and data mentioned above are taken into account by a single processing level. The effect of this is firstly long periods of data storage before being processed, and secondly the time necessary for this processing is too long considering the execution speed performances expected or necessary for these systems. These poor real time performances limit their expansion, particularly prohibiting their use to applications that are not particularly demanding in execution speed and in real time.

Moreover this lack of speed affects the ergonomy of multimedia systems by forcing the operator into unnatural interaction attitudes particularly due to the fact that they are not capable of following and processing more natural attitudes in real time, when gestures are fairly fast and they are mixed with speech and looks.

SUMMARY OF THE INVENTION

The purpose of the invention is to overcome the above mentioned disadvantages, particularly by using functional and material architectures enabling real time management and more ergonomic use of the multimedia interaction system.

Consequently the purpose of the invention is a management process for an interaction system between a man and a machine processing a sequence of incoming data supplied by man to machine interaction means, and including at least two functions operating simultaneously on sequential data, data entering into the system being processed by a first function and the results of this function form the input data for the next function, the results of a final function being input to the machine, and a means of interaction to the man with functions being synchronized between themselves by an exchange protocol.

The main advantages of the invention are that it can reduce the time to process data and information accepted by the system, that it increases its capabilities and capacities in real time, that it can easily be managed by an expert system, that it enables installation of the application software on one or several computers, that it enables nesting of a number of actions and finally that it is economic and easily implemented.

BRIEF DESCRIPTION OF THE DRAWINGS

Other characteristics and advantages of the invention will appear using the following description, to be read with reference to the drawings in the Appendix representing.

DESCRIPTION OF THE INVENTION

Figure 1:
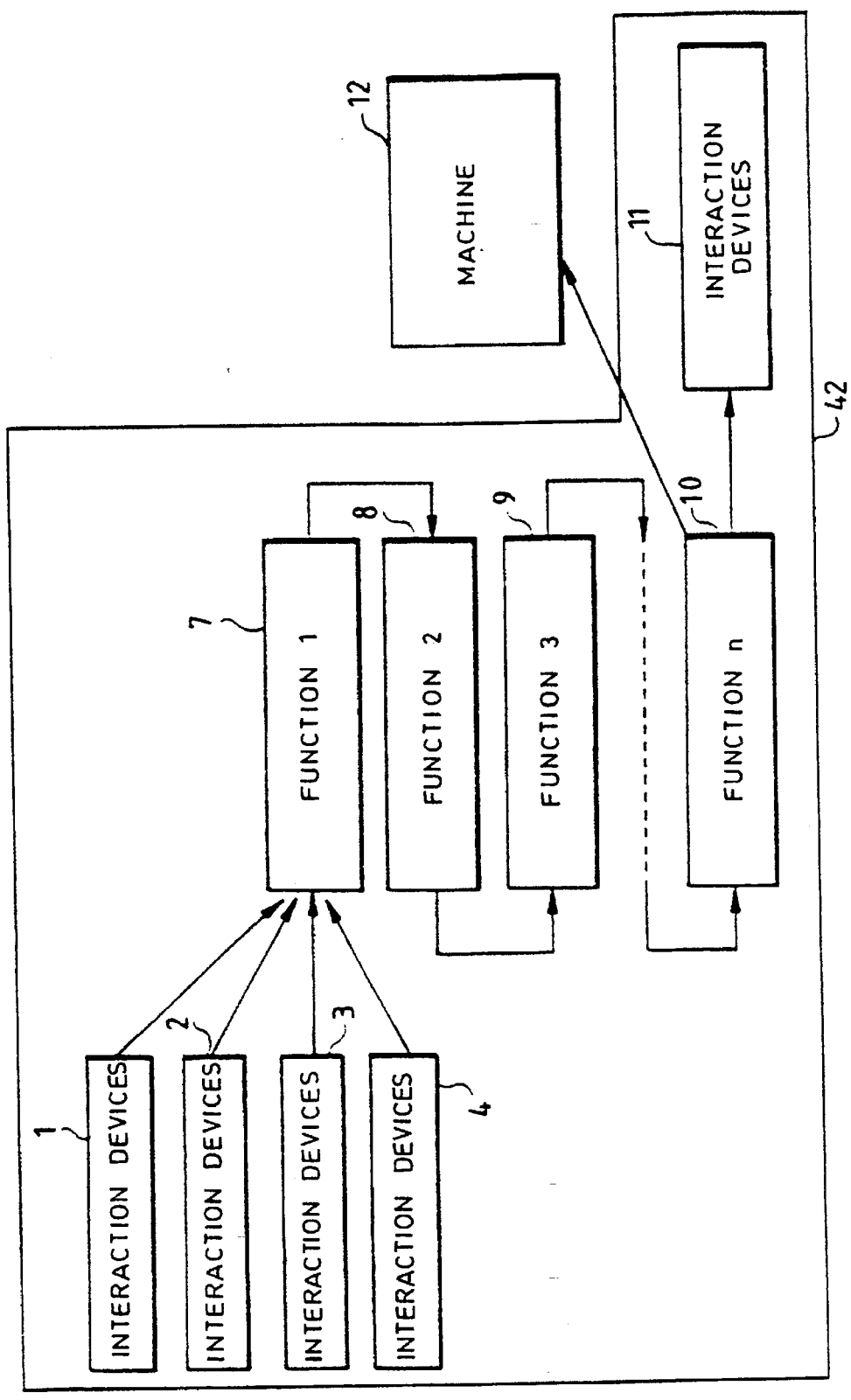
FIG. 1, a block diagram showing the management process for a man-machine interaction system according to the invention.

FIG. 1 shows a block diagram of the management system for a man-machine interaction system 42 according to the invention. In particular, one principle of the invention is to break down management of the man-machine interface into several functions that may be independent and run simultaneously. These functions may be located on different machines. Each function, possibly independently of other functions, carries out specific processing on incoming data. It outputs the result of its processing to the next function. In particular it can synchronized with other functions through a question-answer type exchange protocol, for example handshake. Data input into the first function 7 are output by interaction devices 1, 2, 3, 4, which could be all of the same type. These interactions devices could make use of speech, gesture, look or the position of the hand of an operator 41 in interaction with a machine 12. For example these interaction devices could be made up of speech recognition systems, digital gloves or ocular meters well known to the man skilled in the art. Data are processed by the first function 7, for example carrying out a normalization type of preprocessing. Data output from this first function 7 form the result of processing done by it, and serve as input data to a second function 8 that processes them. Similarly, data output from the second function 8 serve as input data into a third function 9. Data are thus processed in sequence by a series of functions until the $n^{th}$ and last function 10 that processes the output data from the last but one function and outputs data controlling the machine 12 with which the operator 41 is interacting and interaction devices 11 from the machine 12 to the operator 41. For example, these interaction devices 11 could consist of a display screen or a speech synthesis system. In particular the screen displays graphic objects representing the parts of the machine on Which the operator is working. The various functions 7, 8, 9 and 10 run simultaneously. The various procedures that they carry out could be independent of each other. In order to obtain a good execution of the management process, it is desirable that these functions are started in synchronization. Synchronization methods may be of the question-answer type or handshake for example, or any other method known to the man skilled in the art.

For example, the first function 7 could carry out data preprocessing by integrating a normalization operation, a merging operation and a message generation operation. The normalization operation consists of using data output from the various interaction devices and making changes to coordinate systems and converting into suitable units so that they all have the same dimensions and can thus be processed in the same way or merged together. The merging operation consists of carrying out calculations to combine two or more basic data to synthesize higher level information. Thus all basic information that cannot be used as is in subsequent functions, will be eliminated, but without being lost. Finally a message is generated with the purpose of collecting all data used for subsequent functions in a message with a single format. For example its purpose may also be to transcode all redundant data so as to compact the message and therefore make it faster to transmit.

Figure 2:
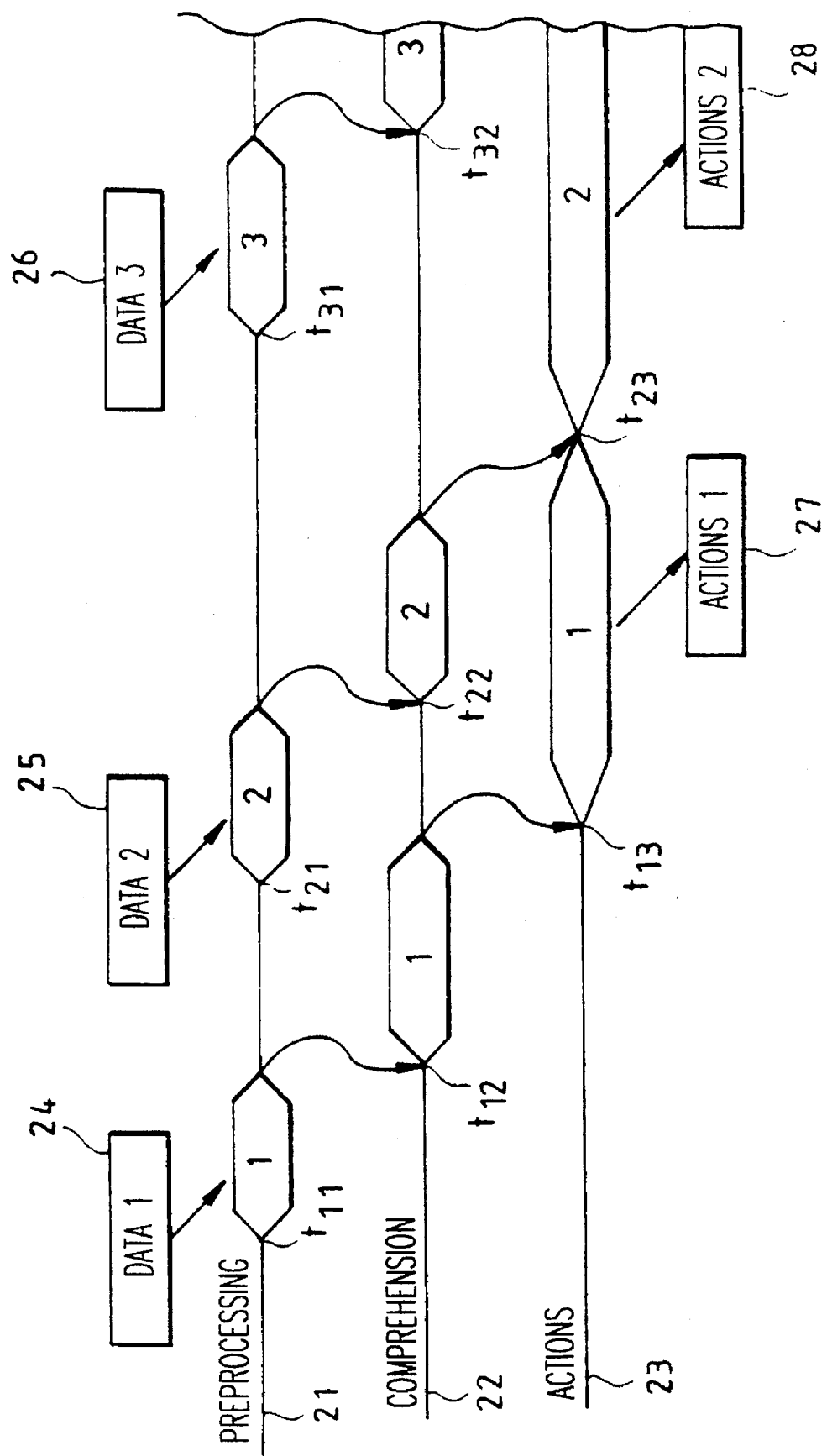
FIG. 2, an example of the temporal positions of possible functions used in the process according to the invention; .

For example, one method of making the device according to the invention could include three management functions operating simultaneously in time in accordance with the block diagram shown in FIG. 2; an initial preprocessing function as described above, a second message comprehension function output by the first function and a third function acting on the machine 12 and on the interactive system 20, for example a display screen or a speech synthesizer.

Data are thus processed successively by a first preprocessing function, a second comprehension function and a third function acting on the machine, for example an aircraft system. These functions operate simultaneously and are synchronized with each other.

The second function, the comprehension function, interprets the message output by the first function, the preprocessing function, in particular to extract the operator's wishes from it in interaction with the system. In particular this function improves the ergonomy of the interaction system by enabling the operator to communicate with the machine with more natural gestures. This function can also verify if the operator's wishes are correctly expressed by the interaction devices, if they are meaningful for the current dialogue between the operator and the machine and if they are possible in the current state of the machine. These checks increase operation safety.

The third function, the action function on the machine and on interaction devices from the machine to the operator, is particularly intended to modify the latter being interacted on as a function of operator requests expressed through interaction devices, the first preprocessing function and the second comprehension function. Modification actions on an interactive system are generally very time consuming. In order to reduce necessary times, elements in the third function could for example be organized so as to process several actions simultaneously, particularly actions on the machine and information feedback to the operator.

FIG. 2 shows temporal positions of the functions in the case of the above mentioned applications. Lines 21, 22, 23 illustrate the temporal position of the preprocessing, comprehension and action functions respectively. An initial data flow 24 forms part of a data sequence 24, 25, 26 input into the interaction system, and is firstly taken into account by the processing function at time $t_{11}$ to be processed until time $t_{12}$, at which time output data or the results of this first processing function are taken into account by the second comprehension function and processed until time $t_{13}$, at which time the output data or the results of this function are taken into account by the action function until time $t_{23}$. The result of this third action function generates a first action or a first series of actions 27. In parallel at time $t_{21}$, for example greater than $t_{12}$ and less than $t_{13}$, the second data flow 25 of the sequence 24, 25, 26 is taken into account by the first preprocessing function until time $t_{22}$, when the results of this function are taken into account by the second comprehension function, for example up to a time less than $t_{23}$. The result of this function could then be stored in buffer memories. At time $t_{23}$, for example, this result is taken into account on the third actions function, the result of which generates a second action or a second series of actions 28. In general, the processing duration of the third action function may be longer than that of other functions. In this case, as shown on FIG. 2, data processing steps carried out by the third action function may be successive and practically without interruption between each processing step. The other two functions can then be synchronized with each other and also with the third function. FIG. 2 illustrates a third data flow 26 forming part of the sequence and being taken into account by the first processing function starting from time $t_{31}$ for example greater than $t_{23}$, up to time $t_{32}$. At this time the results output by the first function may be taken into account by the second comprehension function.

Figure 3:
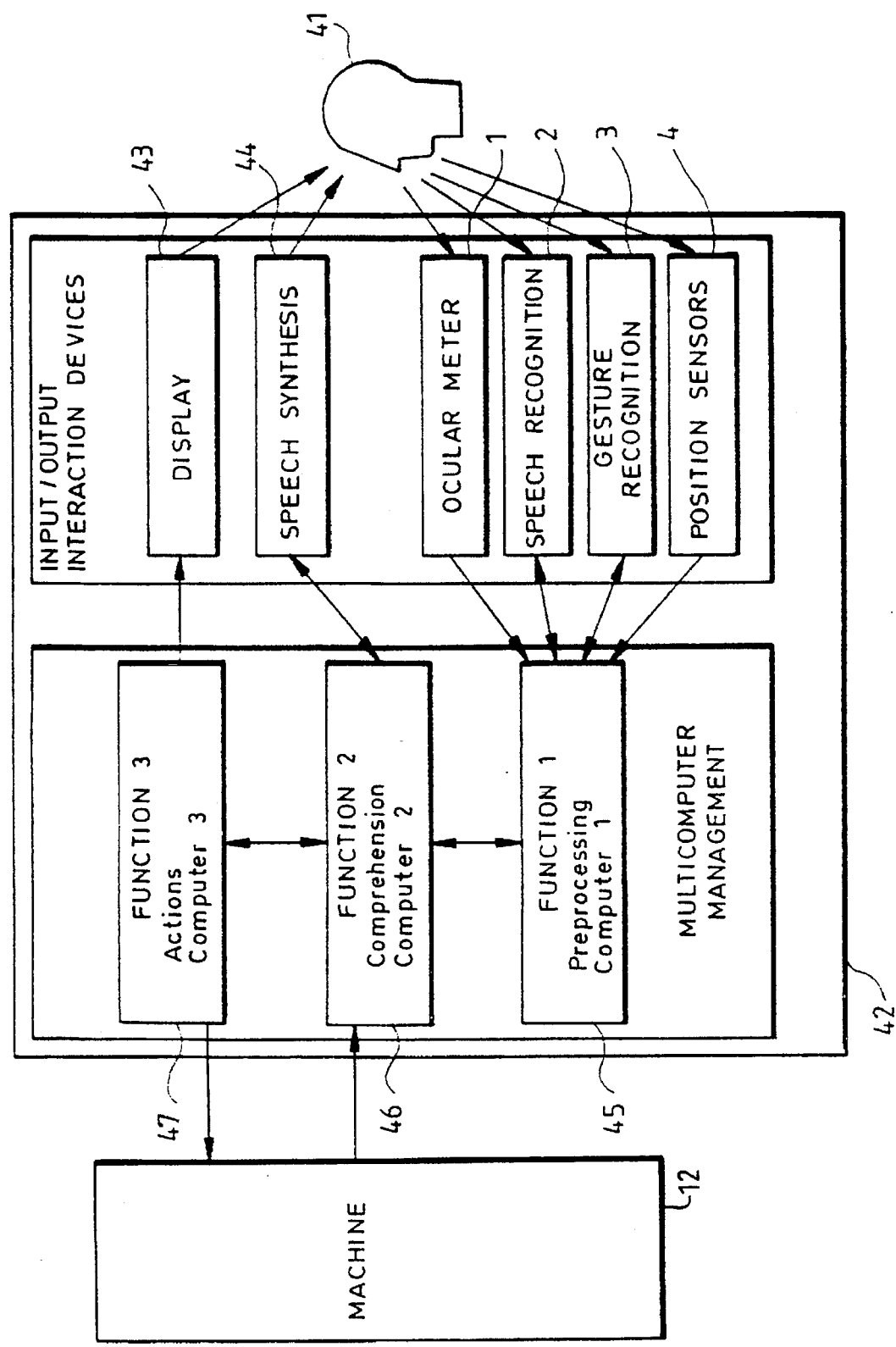
FIG. 3, a possible method of construction of the device using the process according to the invention.

FIG. 3 shows a possible method of making a device in application of the process according to the invention managing the dialogue between man and a machine. This management is performed through a multimedia interaction system, in particular including a large display screen as an interaction device. This multimedia man-machine dialogue system is particularly based on the use of a large picture and interaction devices giving priority to sensorial channels and human motors such as for example speech, gestures, hearing and sight. Its purpose is particularly to facilitate the management of complex systems, for example an aircraft pilot or co-pilot system, by providing optimum dialogue between the man and the machine.

In FIG. 3, a man 41 is in dialogue and in interaction with a machine 12 through an interaction system 42. Interaction devices 1, 2, 3, 4, 43, 44 enable this dialogue. These are firstly interaction devices for input, or from the man 41 to the interaction system, particularly including calculation means 45, 46, 47 intended to implement functions of the type mentioned above. For example, these interaction devices include an ocular meter 1, a speech recognition system 2, a gesture recognition system 3, particularly hand gesture recognition, and position sensors 4, particularly of the hand. All these interaction devices are independent and cyclically and synchronously supply data about the activity of the man 41 acting as an operator. Input interaction devices may also include a stick, a keyboard or a mouse.

The ocular meter 1 measures the direction in which the operator is looking with respect to his head by means of a miniature camera analyzing the corneal reflection of an infra-red diode, for example illuminating the right eye. The speech recognition system 2 may be a continuous speech recognition system triggered by detection of words, for example carrying out a phonetic analysis of the received signal after having broken it down into messages and into words.

The gesture recognition system 3 may be an optical fiber device in a digital glove worn on one hand. This device, known to the expert, can measure the angle at which the first two joints on each finger on the hand are bent. For example an associated device could recognize a posture, particularly the shape of the hand, among a set of previously recorded postures. For example position sensors 4 may be electromagnetic sensors coupled to fixed transmitters defining positions and orientations of the head and hand of the man 41.

Interaction devices also include output interaction devices, from the system to the man 41. For example these may be display devices 43 and speech synthesis devices 44. The display devices 43 may be an overhead projector outputting color pictures on a display screen. The speech synthesis devices 44 could be a speech synthesizer known to the expert associated with a sound device, for example an alert.

For example the man-machine dialogue may be generated by three independent functions operating simultaneously and of the type mentioned above, namely an initial preprocessing function, a second comprehension function and the third actions functions. For example, these functions could be located on different computers, particularly so that they can be executed simultaneously. In this case the first preprocessing function is located on a first computer 45, the second comprehension function is located on a second computer 46 and the third actions function is located on the third computer 47.

Computers 45, 46 and 47 may be interconnected through serial type high throughput links, for example 19200 bauds, and the exchange protocol between these computers could be of the question-answer or handshake type.

The first computer 45 executing the first preprocessing function communicates particularly with input interaction devices 1, 2, 3, 4 to recover data about the activity of the man 41, in other words the operator. It then transforms and merges these data to form a message that it transmits to the second computer 46, for example this message may be output on request of the second computer 46 on which the comprehension function is located. This request from the second computer 46 may also condition the formation of a message by the first computer 45, that has recovered data output by one of the input interaction devices, and only forms a message when asked to do so by the second computer 46. For example the second computer 46 may receive information from the machine 12. For example the independent processing cycle carried out by the first computer 45 may be about 30 ms. It communicates with input interaction devices 1, 2, 3, 4, for example through high throughput serial links at 19200 bauds using various synchronization protocols. For example these synchronization protocols could be an interrupt for speech recognition, a question-answer for gesture recognition and position detections and a synchronization byte for detection of the direction of looking by ocular meter 1. For example the first computer 45 could output messages containing the following information: a synchronization byte, a number indicating a stored posture, an angle at which the index finger of the operator 41 is bent, an angle of rotation of his hand around the axis of his arm, a distance from his hand to the display screen 43, the coordinates of a point on a display screen designated by his hand, the coordinates of a point on the display screen designated by his eye and his head, a status word describing interaction devices, the length of the voice message and the various words in the voice message; for example each of these items of information could be contained on one or two bytes.

The second computer 46 executing the second comprehension function, in particular interprets the contents of the message output by the first computer, this message containing information output by one or several interaction devices. It evaluates the request made by the operator 41 and, for example, deduces actions to be undertaken. It may be fully independent. It communicates with the first computer 45 through a question-answer type protocol and with the third computer 47, for example through a handshake type protocol. The second computer 46 can also interpret the contents of messages from the machine 12.

The third computer 47 executing the third actions function is dedicated mainly to actions on the machine 12, and the generation of pictures presented on display screen 43. It is therefore linked to this display device 43, for example through a serial link. However it is also linked to speech synthesis device 44, forming an output interaction device to the operator 41 and therefore enabling the generation of sound messages that may be the subject of actions generated by the third computer 47. The third computer receives coded messages from the second computer 46, particularly indicating actions to be executed, and therefore information contained in them could be as follows: a synchronization byte, a code for an action to be executed, an object code on which the action will be applied and various parameters in particular defining the action. For example each of these items of information could be contained on one byte.

Actions that the third computer 47 can carry out are mainly oriented towards changing the parameters of machine 12, for example these parameters may be represented by graphic objects displayed on the display screen 43 or the generation of associated sound messages. Examples of actions on machine 12 may be represented on the display screen, particularly by opening a window, closing a window, moving a window, changing the size of a window, adjusting a virtual potentiometer or positioning a virtual button.

Figure 4:
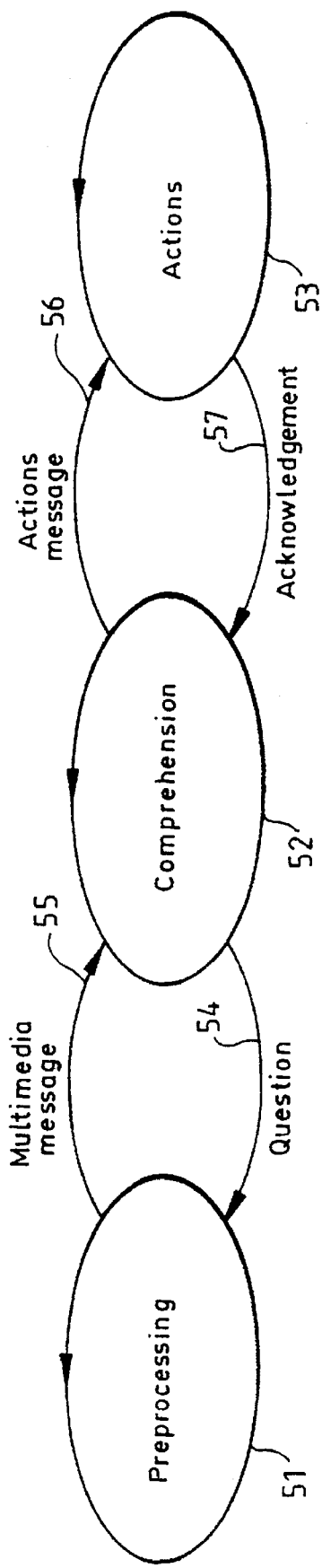
FIG. 4, an illustration of the simultaneous execution of possible functions making up the process according to the invention, and examples of exchange protocols between them.

FIG. 4 illustrates simultaneous execution of functions located on the three computers 45, 46, 47 for the application example mentioned above in the process according to the invention. It also illustrates possible exchange modes between these computers. Three closed loops 51, 52, 53 illustrate independent execution of the first preprocessing function on the first computer 45, the second comprehension function on the second computer 46, and the third comprehension function on the third computer 47, respectively. If, for example, the exchange protocol between the first and the second computers is of the question-answer type, the second computer sends a question 54 to the first computer that outputs a multimedia message 55. This message is qualified as multimedia because it generally contains information supplied by various interaction devices. If, for example, the exchange protocol between the second and third computers is of the handshake type, the second computer sends an action message 56 to the third computer containing actions to be generated by the third computer, that transmits an acknowledgement 57 to the second computer to confirm that it has understood the actions to be taken.

The above mentioned exchange protocols mean that execution of functions located on the various computers are not fully independent of each other. However apart from exchange constraints, these functions can carry out autonomously and independently.

In the above mentioned application example, action messages incoming from the second computer 46 dedicated to the comprehension function may for example accumulate inside a FIFO (First In First Out) type stack in a memory.

The third computer 47 may process several actions simultaneously. The various computer resources assigned to this actions will then search for actions to be executed in the stack, and when an action is selected, return an acknowledgement to the second computer 46.

The management process according to the invention is particularly useful for systems containing several interaction devices, however its principle is independent of the number of interaction devices and is particularly useful when there is a large amount of input data to be processed, and it can be applied to a system in which there is only one man to machine input interaction device.

We claim:

1. A man-machine interface apparatus, comprising:

at least two man-interaction devices each providing a respective data output;

data preprocessing means receiving said respective data output from said at least two man-interaction devices and outputting preprocessed data;

a comprehension function means receiving said preprocessed data and processing said received input and providing a processed output which provides for a comprehension of a function desired for said man in response to an interaction of said man and said interface; wherein said output of said man-interaction devices is in the form of a data sequence fed to said preprocessing means and wherein said preprocessing means and comprehension function means act in synchronism with each other on respective data of said data sequence;

a machine function interface means for receiving said processed output from said comprehension function means for converting said processed output to machine commands in correspondence with and in synchronism with said data sequence from said at least two man-interaction devices to provide machine commands containing a global message including normalized information delivered by all of said at least two man-interaction devices.

2. A device as claimed in claim 1, wherein said preprocessor means sends signals indicative of the wishes of the man via messages to said comprehensive function interface means and wherein said messages are sent by question answer mechanism.

3. A device as claimed in claim 1, wherein said preprocessor means sends signals indicative of the wishes of the man via messages to said comprehensive function interface means and wherein said messages are sent by handshake mechanism.

4. A device as in claim 1 wherein each of said preprocessor means is a separate and distinct computational unit.

5. A man machine interface apparatus according to claim 1, at least two man interaction devices being selected from the group of ocular meters, speech recognition means, or gesture recognition means.

* * * * *